E. FARRA.
SYSTEM OF UTILIZING THE POWER OF TIDE AND WAVE.
APPLICATION FILED OCT. 22, 1912.
1,147,082.
Patented July 20, 1915.
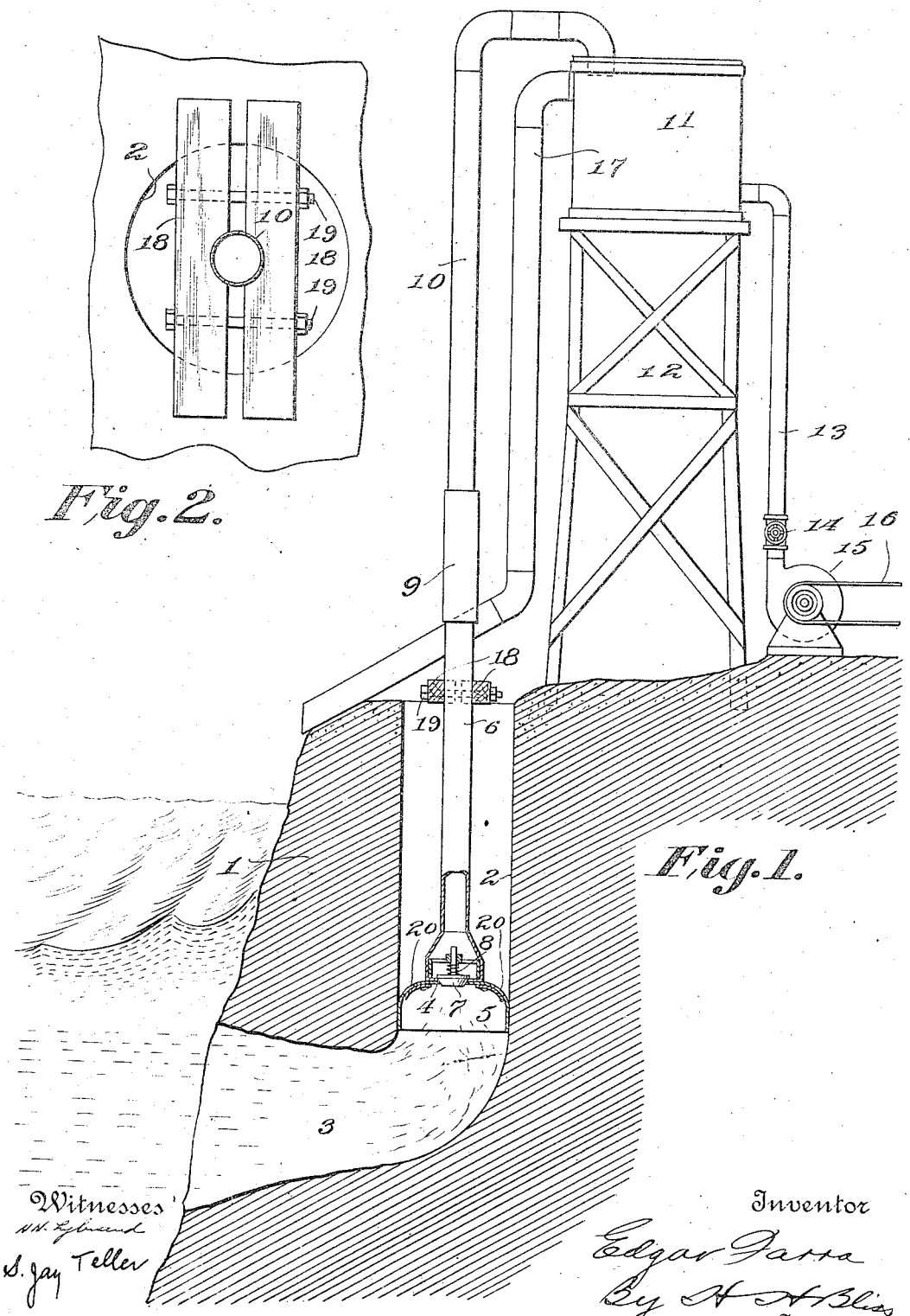

UNITED STATES PATENT OFFICE.

EDGAR FARRA, OF TURLOCK, CALIFORNIA.

SYSTEM OF UTILIZING THE POWER OF TIDE AND WAVE.

1,147,082. Specification of Letters Patent. Patented July 20, 1915.

Application filed October 22, 1912. Serial No. 727,250.

*To all whom it may concern:*

Be it known that I, EDGAR FARRA, a citizen of the United States, residing at Turlock, in the county of Stanislaus and State of California, have invented certain new and useful Improvements in Systems of Utilizing the Power of Tide and Wave, of which the following is a specification, reference being had therein to the accompanying drawing.

This invention relates to an improved system for applying, storing and utilizing the power of waves and tide.

The invention relates more especially to systems of the accumulator type in which the force of the tide and waves is utilized without the use of mechanical pumps or other mechanisms for moving water upward into a tank or other receptacle from which it can be drawn as needed for driving a motor, or for other purposes.

I am aware that it has been before proposed to utilize the force of breakers or of surf by providing receivers for the horizontally moving water, these receivers being connected with pipes by means of which a small part of the wave body could be conducted away and upward.

A system embodying my invention is to be distinguished from these heretofore proposed surf or beach systems in that it involves a precipitous sea wall or cliff against and adjacent which the waves and tide act. The object of my invention, therefore, is to provide an accumulator system which is arranged to take advantage of and utilize the force of tide and waves at a rocky shore, it being understood that, by my improved system, advantage is taken both of the horizontal and the vertical movements of the water during the wave action.

One of the advantages of my system is that it makes use of the natural rocky sea wall and is therefore fully protected from damage. Most earlier mechanisms which have been proposed and tried for utilizing the power of waves and tide have been open to the objection that they were exposed to the action of the water in such a way that they could be easily destroyed in case of storm.

In the accompanying drawing I have illustrated the form of mechanism which I now deem preferable, but it will be understood that numerous changes and modifications in structural details can be made without departing from the spirit of my invention.

Of the drawings, Figure 1 is a side elevation of my improved system, some of the parts being shown in section. Fig. 2 is a detail view of the clamp for supporting the pipe.

Referring to the drawing, 1 represents as a whole a rock sea wall or cliff in connection with which my system is intended to be used. In this sea wall or cliff I first form a vertical well or shaft 2 at a convenient distance from the ocean. The walls of this well are made smooth in any desired way. After the well has been completed, a connection or passageway is made between its lower end and the ocean, preferably by blasting out the rock. Such a passageway is indicated in the drawing by 3. The level of this passageway 3 is such that its upper wall or roof is below the level of the ocean at low tide, the intent being to keep the passageway 3 at all times full of water.

At a suitable elevation in the well 2, and preferably near the passageway 3, I provide a bell 4, the edges of which engage the walls of the well and form a tight joint therewith. At the upper part of this bell 4 there is an aperture 5 which communicates with a vertical pipe 6 secured to the bell. In the aperture 5 there is mounted a check valve 7 which may be of any desired type. In the drawing for purposes of illustration I have shown a valve of the puppet type which is normally held closed by a spring 8. The valve can be opened when a slight pressure is applied to its lower side. The pipe 6 communicates at its upper end by means of a slip joint 9 with a second vertical pipe 10 which communicates at its upper end with a tank or reservoir 11 mounted upon a suitable tower 12.

The movement of the tide and waves causes a corresponding movement of the water within the well 2 and the result is that the water in this well is constantly surging upward and downward with much force and with considerable frequency. The vertical movement of the water in the well 2 is not merely the result of the vertical movement of the water outside, but is in large part due to the horizontal movement of the water as it rushes up against the wall 1 and into the opening 3. The apparatus which I have described is intended and designed to take advantage of the upward and downward surging of the water in the well 2. The water in the well 2 tends to move upward considerably above the bell 4 with the result that when the water encounters the bell it exerts upon it a powerful ram action which is relieved only by the opening of the valve 7 and the passage of the water upward through the aperture 5 and into and through the pipe 6. As soon as the upward movement of the water in the well 2 ceases, the valve 7 at once closes under the influence of the spring 8 and backward flow of water downward through the pipe 6 is prevented. At the next upward surge of the water, the valve 7 is again opened and the action is repeated, the result being that water is ultimately forced upward through the pipes 6 and 10 into the reservoir 11.

From the reservoir 11 the water can be drawn off to be used in any desired way. In the drawing I have shown a pipe 13 controlled by a valve 14. This pipe connects with the reservoir at its upper end and at its lower end with a motor or turbine 15 from which power can be transmitted by a belt 16 to be used at a dynamo or otherwise.

The reservoir 11 should preferably be of such a size that it can contain sufficient water to keep the turbine in operation during the periods of minimum lifting efficiency of the tide and waves. At extremely low tide or during a calm, the lifting action of the tide and waves will be reduced and at these times the deficiency in the quantity of water supplied will be made up from the reservoir 11. Under other conditions, however, more water will be lifted than can be utilized by the turbine 15 and I therefore provide an overflow at 17 through which the surplus water can be discharged back to the ocean. The pipe 13 is much smaller than the pipes 6 and 10, as it need carry only a steady stream, whereas the pipes 6 and 10 must at times of maximum action carry large bodies of water to be stored and utilized at times of minimum action.

Preferably the pipe 6 is supported by means of two timbers 18, 18, which are clamped to the pipe by means of bolts 19. As there is a slip or telescopic connection between the pipes 6 and 10, it will be seen that the pipe 6, and the bell 4 attached to it, can be moved at any desired elevation and secured in place by means of the clamping timbers 18, 18. In designing a system of this sort it is often difficult to determine in advance the exact elevation at which the bell should be placed for maximum efficiency. By means of the adjustable mounting which I have described, the elevation can be varied and the bell can, by experiment, be located to give the best results.

In addition to the devices which I have already described, I prefer to also provide air valves 20, 20 in the bell 4. These valves may be of any desired type. They open inward and are automatically closed by the pressure on the inner side of the bell when the water surges upward. However, when the water recedes these air valves 20, 20 open and a quantity of air is drawn into the space beneath the bell. When the water again surges upward this entrapped air is forced upward through the aperture 5 and with the water through the pipes 6 and 10. Because of this air mixed with the water the total weight of the column in the pipes is less and the water can, on this account, be lifted to a greater elevation than would be the case if the air valves were omitted. Furthermore, the air valves make possible a freer movement of the water within the well 2. Were it not for the valves there would be a tendency for a partial vacuum to be formed beneath the bell as the water recedes and this would tend to prevent the water reaching its minimum level. With the valves, however, the water can descend freely, with the result that it moves upward through a greater distance and consequently with a greater force, which force is expended in lifting the valve 7 and in forcing the water upward through the pipes.

It is well known that sea water has a very deleterious action on metallic pipes and containers. For this reason I prefer to form the pipes which I have described, and also the reservoir, of eucalyptus wood upon which sea water has little or no effect. Other materials may, however, be used if desired.

What I claim is:—

1. In a system for utilizing the power of tide and waves, the combination with a sea wall having therein a vertical well and a passageway to the water below its lowest level whereby water in the well can surge upward and downward under the influence of the tide and waves, of a pipe connected at its lower end with the walls of the well, an automatically closing valve at the lower end of the pipe adapted to be opened by upward surging water in the well to admit water to the pipe, and a reservoir for receiving water discharged from the upper end of the pipe.

2. In a system for utilizing the power of tide and waves, the combination with a sea wall having therein a vertical well and a passageway to the water below its lowest level whereby water in the well can surge upward and downward under the influence of the tide and waves, of a vertical pipe terminating at its lower end in the well, a bell connected at its edges with the walls of the well and at its top with the lower end of the pipe, the said bell having air-intake apertures, automatic valves for the air-intake apertures adapted to permit the flow of air into the bell but to prevent its flow outward, an automatic valve at the lower end of the pipe adapted to be opened by the upward movement of water and air in the space beneath the bell, the air and water moving upward through the pipe, and a reservoir for receiving water from the upper end of the pipe.

3. In a system for utilizing the power of tide and waves, the combination with a sea wall having therein a vertical well and a passageway to the water below its lowest level whereby water in the well can surge upward and downward under the influence of the tide and waves, of a vertical pipe terminating at its lower end in the well, a bell connected at its edges with the walls of the well and at its top with the lower end of the pipe, an automatic valve at the lower end of the pipe adapted to be opened by the upward movement of water in the well, a second pipe having a slip connection with the first pipe at its upper end whereby the first pipe and the bell may be vertically adjusted, means for holding the first pipe and the bell in adjusted position, and a reservoir for receiving water from the upper end of the second pipe.

In testimony whereof I affix my signature, in presence of two witnesses.

EDGAR FARRA.

Witnesses:
S. JAY TELLER,
GEORGE E. EDELIN.